United States Patent [19]

Maida

[11] 3,946,410

[45] Mar. 23, 1976

[54] ELECTROMAGNETIC TRIGGER DEVICE

[75] Inventor: Osamu Maida, Tokyo, Japan

[73] Assignee: Nippon Kogaku K.K., Tokyo, Japan

[22] Filed: July 19, 1974

[21] Appl. No.: 490,220

[30] Foreign Application Priority Data

| July 24, 1973 | Japan | 48-82707 |
| July 24, 1973 | Japan | 48-82708 |
| Oct. 26, 1973 | Japan | 48-119963 |
| Feb. 1, 1974 | Japan | 49-12859 |

[52] U.S. Cl. ............ 354/173; 354/212; 352/169; 242/71.5
[51] Int. Cl.² ......................................... G03B 1/18
[58] Field of Search .......... 354/173, 170, 171, 212, 354/213, 204; 242/71.5; 352/169

[56] References Cited
UNITED STATES PATENTS

| 3,576,362 | 4/1971 | Mayr et al. | 352/169 |
| 3,601,481 | 8/1971 | Kessler | 352/169 |
| 3,721,492 | 3/1973 | Kessler | 352/169 X |
| 3,804,499 | 4/1974 | Higuma | 352/169 |

Primary Examiner—Robert P. Greiner
Attorney, Agent, or Firm—Shapiro and Shapiro

[57] ABSTRACT

A capacitor-energized electromagnetic trigger device controls the energization of a camera motor which drives a film transport and shutter mechanism. For one-frame photography the motor is de-energized after a predetermined number of revolutions and then the transport and shutter mechanism is immobilized by a restraining device. For continuous photography the motor continues to operate and the restraining device is maintained ineffective. For repetitive one-frame photography, the capacitor is recharged after a one-frame cycle and the cycle is repeated. Embodiments are disclosed having different types of switching circuits, including different arrangements of transistor switches, SCR switches, mode selection switches, reset switches, and starting and holding coils.

9 Claims, 14 Drawing Figures

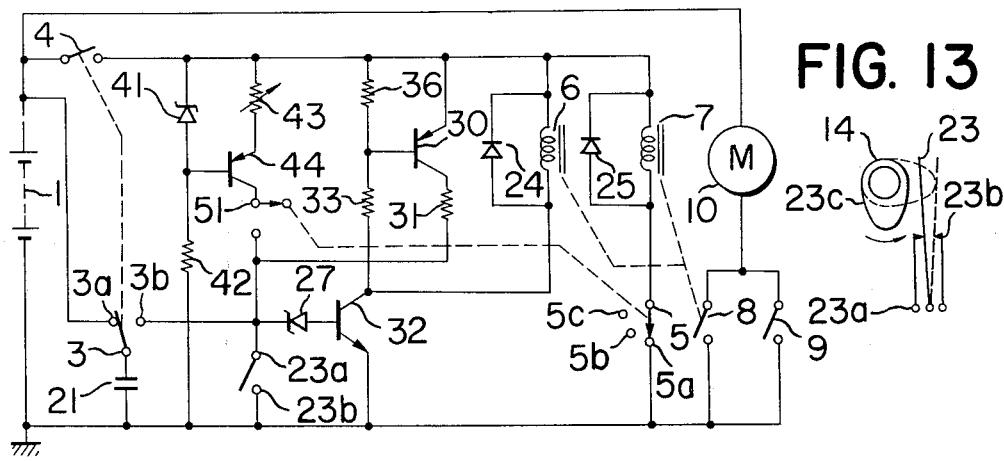
FIG. 11
FIG. 13
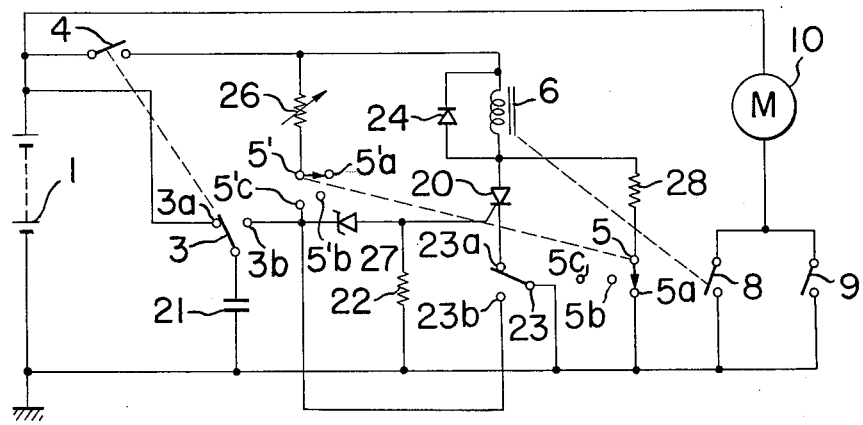
FIG. 12
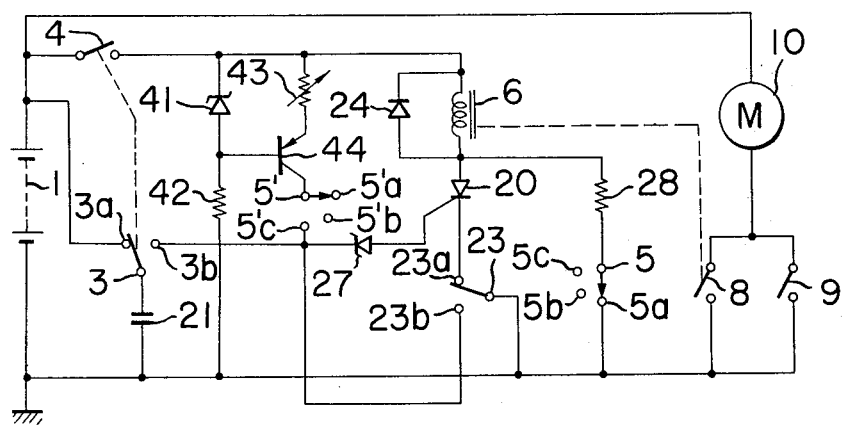
FIG. 14

ELECTROMAGNETIC TRIGGER DEVICE

BACKGROUND OF THE INVENTION

1. Field of the Invention

This invention relates to an electromagnetic trigger device having a trigger circuit for use in cameras, especially cinecameras.

2. Description of the Prior Art

An electromagnetic trigger device for cinecameras is known in which a starting capacitor charged prior to photography is caused to discharge and the discharging current flows to a starting coil, whose magnetic force closes a switch in a drive motor circuit to start photography, whereafter the capacitor completes its discharge to open the switch in the motor circuit, whereby one-frame photography is accomplished.

Such device, however, has offered a problem that one-frame photography fails to properly occur due to variation in the speed of revolutions of the motor, variation in the capacity of the starting capacitor, variation in the resistance of the coil or variation in the source voltage.

Also, in such conventional electromagnetic trigger device, the charge stored in the starting capacitor is discharged as a heavy current through a starting coil of low resistance to thereby start the electromagnetic trigger device and in this connection, the starting capacitor must be of great capacity which in turn leads to a larger size of the device.

Further, U.S. Pat. No. 3,601,481 discloses a system whereby, at the start of photography, a bistable circuit is triggered into conductive state and during the conductive state of the bistable circuit, a current is supplied from a power source to a coil, whose electromagnetic force closes a switch in a motor drive circuit to thereby accomplish photography. Such system requires a current equal to that at the starting to constantly flow to the coil throughout the photography, and this offers some problems including the great power consumption and the necessity of adding a timer circuit for the purpose of one-frame timer photography.

SUMMARY OF THE INVENTION

The present invention intends to overcome the above-noted disadvantages and to provide an electromagnetic trigger device which reliably enables one-frame photography to be accomplished.

In accordance with the present invention, the electromagnetic trigger device comprises a motor for driving a film transport mechanism and shutter mechanism in a camera, a motor switch which, when closed, is adapted to connect the motor to a power source, starting means which, when energized, is adapted to produce an electromagnetic force for closing the motor switch, switching means which, when in conductive state, is adapted to connect the starting means to the power source, and a starting capacitor. A trigger switch is provided which is adapted, before the start of photography, to connect the starting capacitor to the power source to charge the capacitor, and at the start of photography, to connect the starting capacitor to the input terminal of the switching means to apply the terminal voltage of the starting capacitor to the switching means to thereby trigger the switching means into conductive state. Means is provided which is responsive to rotation of the motor started upon closing of the motor switch to render the switching means non-conductive when the motor has made a predetermined number of revolutions within the number of revolutions required for the motor to transport one frame of film. Further provided is holding means which is energized only during continuous photography to produce an electromagnetic force for holding the motor switch in closed position, and a mode selecting switch for selecting any desired mode of photography which is adapted to be closed only during continuous photography to connect the holding means to the power source.

The invention will become more fully apparent from the following detailed description of various embodiments thereof taken in conjunction with the accompanying drawings.

BRIEF DESCRIPTION OF THE DRAWINGS

FIG. 11 is a circuit diagram showing an eighth embodiment of the present invention.

FIG. 12 is a circuit diagram showing a ninth embodiment of the present invention.

FIG. 13 is a view of the reset switch in FIG. 12 and taken in the direction of the shaft of the reset switch.

FIG. 14 is a circuit diagram showing a tenth embodiment of the present invention.

DESCRIPTION OF THE PREFERRED EMBODIMENTS

Figure 1:
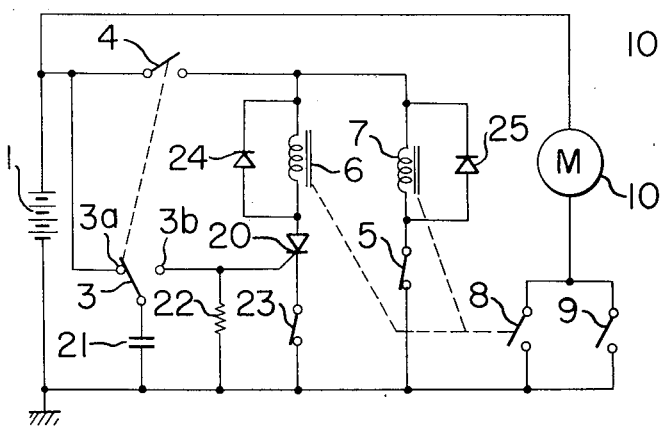
FIG. 1 is a circuit diagram showing a first embodiment of the present invention.
Figure 2:
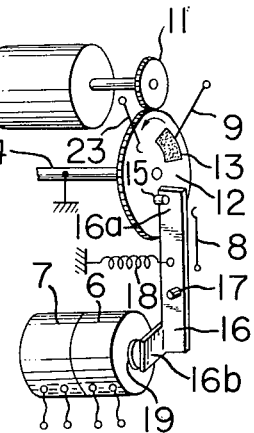
FIG. 2 is a perspective view showing a mechanism portion to which the circuit of FIG. 1 is applied.

Referring to FIGS. 1 and 2, there is shown a first embodiment of the present invention.

In FIG. 1, a starting capacitor 21 is connected to a power source 1 through a contact 3a of a trigger switch 3. A serial connection of a starting coil 6 and a silicon controlled rectifier (SCR) 20 is connected to the power source 1 through a holding switch 4 and a reset switch 23. The reset switch 23 is responsive to rotation of a motor 10 so as to be opened after photography has been started but before one-frame photography has been completed, and the opening of the switch 23 renders the SCR 20 non-conductive. A discharging resistor 22 is connected to a capacitor 21 through a contact 3b of the switch 3.

Since the gate of the SCR 20 is connected to the contact 3b, the terminal voltage of the capacitor 21 is applied to the gate when the switch 3 is closed at its contact 3b.

The trigger switch 3 is operatively associated with the holding switch 4 and also with an unshown camera's release button, and when the release button is in underpressed or inoperative position, the trigger switch 3 is closed at its contact 3a and the holding switch 4 is in its open position. Upon manual depression of the release button, the holding switch 4 is closed and the trigger switch 3 is changed over to its contact 3b, thereby establishing a photographing condition as will be described hereinafter.

A holding coil 7 having a great winding resistance is connected to the power source 1 through switches 4 and 5. The switch 5 is a change-over switch for changing over the mode of photography between continuous photography and one-frame photography, and it permits occurrence of one-frame photography when it is in open position and permits occurrence of continuous photography when it is in closed position. Diodes 24 and 25 are provided for absorbing the counter electromotive force of coils 6 and 7.

In the perspective view of FIG. 2, an electrically conductive reduction gear 12 is at ground potential since a main interlocking shaft 14 integral therewith is grounded.

The reduction gear 12 may be driven from the motor 10 through a motor gear 11. The main interlocking shaft is connected to an unshown shutter mechanism, film transport mechanism, etc. so that one full rotation of the gear 12 may accomplish one-frame photography. The gear 12 has a projection 15 and an insulating plate 13 both provided on one side surface thereof. When a restraining lever 16 is in engagement with the projection 15, a phase switch 9 may contact the insulating plate 13 to be opened thereby, and the shutter mechanism and the interlocking shaft 14 are related with each other so that the shutter may be closed during the engagement of the restraining lever 16 with the projection 15. The restraining lever 16 is rotatably supported on a rotary shaft 17, and has at one end a restraining pawl 16a engageable with the projection 15 and at the other end an attracted member 16b. The lever 16 is biased counter-clockwise about a pin 17 by a spring 18. A core 19 is common to the coils 6 and 7, and when excited, this core will attract the member 16b to rotate the restraining lever 16 clockwise against the force of the spring 18 to bring the restraining pawl 16a out of engagement with the projection 15, thereby making the gear 12 free to rotate. The restraining lever 16 and the spring 18 are electrically conductive and the latter is grounded. Thus, when the restraining lever 16 has been rotated clockwise by the attraction of the electromagnet 6, 7, 19 to bring the restraining pawl 16a out of engagement with the projection 15, the motor switch 8 is engaged by the restraining lever 16 to electrically connect the motor 10 to the power source 1.

A switch 23 is disposed so that it may contact the one side surface of the conductive gear 12 and that the point of such contact lies in the orbit of the insulating plate 13.

Operation of the above-described construction will now be explained.

For continuous photography, the switch 5 is closed and the camera's release button is depressed to operate the trigger switch 3 and the holding switch 4 so that the switch 3 is changed over from the contact 3a to the contact 3b and the switch 4 closed. The change-over of the switch 3 to the contact 3b permits the terminal voltage of the capacitor 21 to be applied to the gate of the SCR 20, which is thus rendered conductive.

As a result, a current flows to the starting coil 6 and holding coil 7, the member 16b is attracted by the core 19 of the electromagnet, the restraining lever 16 is rotated clockwise out of engagement with the projection 15, and the switch 8 is closed to rotate the motor 10.

When the rotation of the motor 10 brings the insulating plate 13 into contact with the switch 23, the reset switch 23 is opened to render the SCR 20 non-conductive. Thus, there is no current flowing to the coil 6 but a current continues to flow to the coil 7, whereby member 16b remains attracted to the core 19 of the electromagnet.

Thus, the motor 10 still continues to rotate and, when the insulating plate 13 comes out of contact with the reset switch 23, this reset switch is closed. However, when the SCR 20 is triggered, the capacitor 21 discharges through the SCR 20 and the residual charge is also discharged through a resistor 22, so that the capacitor 21 has no longer the charge for triggering the SCR 20 even if the reset switch 23 is again closed, and thus the SCR 20 remains in non-conductive state.

In order to terminate the photography, the camera's release button is released to return the switches 3 and 4 to their shown positions, whereby the current flow to the holding coil 7 is cut off to permit the restraining lever 16 to be returned to its original position by the spring 18 and the phase switch 9 permits the motor 10 to rotate until it is stopped at a position where the projection 15 is engaged with the restraining pawl 16a.

One-frame photography will now be described.

The switch 5 is opened. The camera's release button is depressed to change over the switch 3 from the contact 3a to the contact 3b, thereby closing the holding switch 4. The starting operation is the same as what has previously been described, but there is no current flowing to the holding coil 7 and therefore, when the rotation of the motor 10 brings the insulating plate 13 into contact with the switch 23 to open this switch, and the SCR 20 is rendered non-conductive, the restraining lever 16 is restored to its initial position to open the motor switch 8. The phase switch 9 enables the motor to rotate until it is stopped at the position where the projection 15 is engaged with the restraining pawl 16a.

Figure 3:
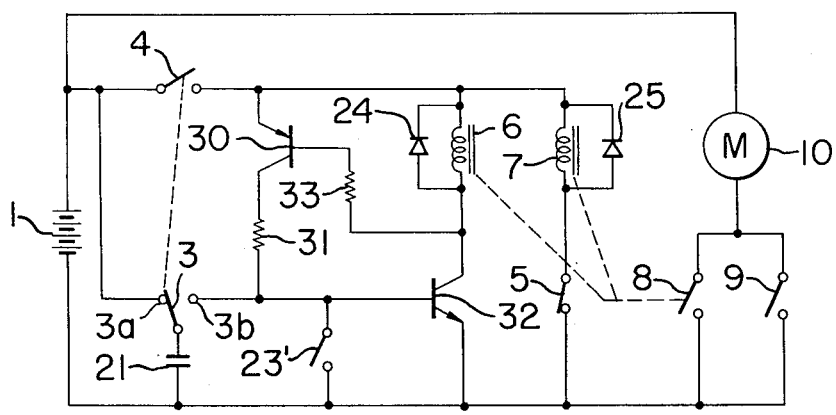
FIG. 3 is a circuit diagram showing a second embodiment of the present invention.

FIG. 3 illustrates a second embodiment of the present invention which employs two transistors in lieu of the SCR employed in the first embodiment.

Figure 8:
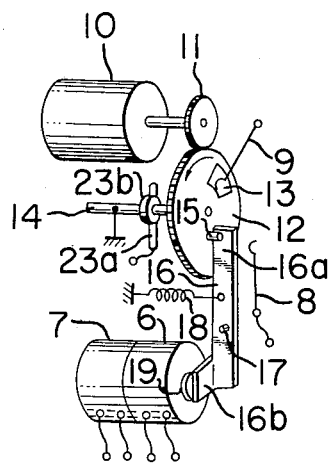
FIG. 8 is a perspective view showing a mechanism portion to which the circuit of FIG. 7 is applied.
Figure 9:
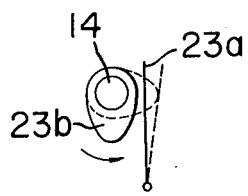
FIG. 9 is a view of the reset switch in FIG. 8 and taken in the direction of the shaft of the reset switch.

A transistor 30 has its emitter connected to the positive (+) terminal of the power source 1 through the holding switch 4, its collector connected to the base of a transistor 32 through a resistor 31, and its base connected to the collector of the transistor 32 through a resistor 33. The emitter of the transistor 32 is connected to the negative (−) terminal of the power source 1 and the collector is connected to the positive terminal of the power source 1 through the coil 6 and holding switch 4. A reset switch 23', which is similar to later-described switches 23a and 23b of FIGS. 8 and 9, is parallel-connected between the base and emitter of the transistor 32.

Alternatively, the reset switch 23' may be parallel-connected between the base and emitter of the transistor 30. The reset switch 23' replaces the reset switch 23 of the first embodiment and is designed such that it is opened before the start of photography but is closed in response to rotation of the motor 10 a predetermined time after the start of photography and at least before completion of one-frame photography. In the other points, the second embodiment is identical with the first embodiment.

Thus, to effect photography, the switch 4 is closed and the switch 3 is changed over from the contact 3a to the contact 3b, whereupon the terminal voltage of the capacitor 21 is applied between the base and emitter of the transistor 32 since the reset switch 23' is open, and thus the transistor 32 is rendered conductive.

This conduction of the transistor 32 also renders the transistor 30 conductive so that the collector current of the transistor 30 flows to the base of the transistor 32. Therefore, even after the charge stored in the capacitor 21 has been discharged, the transistor 32 will remain conductive unless the reset switch 23' is closed.

Thereafter, when the reset switch 23' is closed in response to rotation of the motor 10, the transistors 32 and 30 become non-conductive to cut off the current flow to the starting coil 6. Also, even when the switch 23' is again opened, the transistor 32 will never conduct again, because the capacitor 21 has completely discharged during the closing of the switch 23'.

The reset switch 23' short-circuits the base-emitter of the transistor 32 so that no heavy current flows to that switch, and this leads to increased durability of the switch.

Thus, the opening-closing of the switch 5 enables one-frame photography or continuous photography to be accomplished just in the same way as described with respect to the first embodiment. Further, both in the first and the second embodiment, the holding switch 4 serves to cut off the current flow to the holding coil 7 and so, it will be apparent that the position of this switch is not restricted to that shown in the present embodiment.

In the embodiment shown in FIG. 3, the transistor switching circuit comprising transistors 30 and 32 is a switching circuit having bistable conditions equivalent to SCR, whereas the switching circuit for connecting the starting coil 6 to the power source need not have such bistable conditions but may be any switching circuit which will remain conductive only from the starting of the motor 10 till the closing of the phase switch 9.

Figure 4:
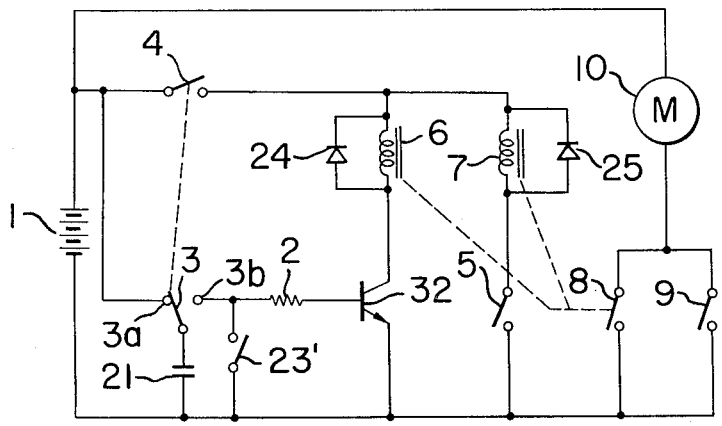
FIG. 4 is a circuit diagram showing a third embodiment of the present invention.

FIG. 4 shows a third embodiment which employs a single switching transistor in lieu of the SCR 20 used in the first embodiment. When the holding switch 4 is closed and the trigger switch 3 is changed over from the contact 3a to the contact 3b, the terminal voltage of the capacitor 21 is applied to the transistor 32 through the resistor 2 to render the transistor 32 conductive. This permits a current flow to the coil 6, whose electromagnetic force closes the motor switch 8 to rotate the motor 10. If the capacity of the capacitor 21, the resistance value of the resistor 2, the time during which the phase switch 9 remains closed, etc. are set so that the transistor 32 remains conductive till the phase switch is closed, then there will occur entirely the same operation as that of the second embodiment shown in FIG. 3.

Any of the three embodiment hitherto described employs two starting and holding coils, but the use of a single coil would lead to reduction in the size of the device.

A fourth embodiment of the present invention will now be described which employs a single coil for both the starting and the holding, in lieu of two separate coils for the respective purposes.

Figure 5:
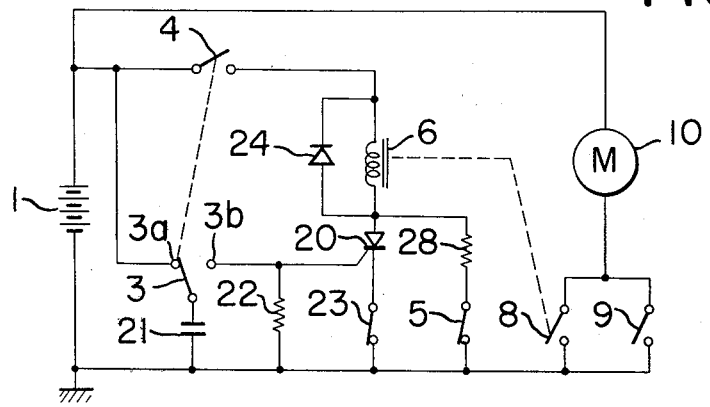
FIG. 5 is a circuit diagram showing a fourth embodiment of the present invention.

In FIG. 5, the starting capacitor 21 is connected to the power source 1 through the trigger switch 3 and its contact 3a. A serial connection of starting coil 6 and SCR 20 is connected to the power source 1 through the switches 4 and 23. The reset switch 23 is responsive to rotation of the motor 10 so as to be opened after the starting of photography but before completion of one-frame photography, thereby rendering the SCR 20 non-conductive. The discharging resistor 22 is connected to the capacitor 21 through the switch 3 and its contact 3b.

Since the gate of the SCR 20 is connected to the contact 3b, the terminal voltage of the capacitor 21 is applied to the gate when the switch 3 is connected to the contact 3b. The diode 24 serves to absorb the counter electromotive voltage of the coil 6. Resistor 28 has one end connected to the junction between the starting coil 6 and the SCR 20 and the other end connected to the power source 1 through the switch 5 for changing over the mode of photography between continuous photography and one-frame photography.

The resistor 28 and the coil 6 cooperate to act as the holding coil 7 in FIGS. 1, 3 and 4.

For this purpose, the resistance value of the resistor 28 is selected such that the attracted member 16b may remain attracted to the core 19 by current as determined by the winding resistance value of the coil 6 and the resistance value of the resistor 28.

Operation will now be explained.

For continuous photography, the switch 5 is closed to operate the switches 3 and 4 so that the switch 3 is changed over from the contact 3a to the contact 3b and the switch 4 is closed. The change-over of the switch 3 to the contact 3b permits the terminal voltage of the capacitor 21 to be applied to the gate of the SCR 20, thereby rendering the SCR conductive. The forward resistance of the SCR during its conduction is so small as to permit a heavy current to flow to the starting coil 6 to cause the core 19 of the electromagnet to attract the member 16b, so that the restraining lever 16 is rotated clockwise to liberate the projection 15 and the switch 8 is closed to rotate the motor 10. When the rotation of the motor brings the insulating plate 13 into contact with the switch 23, the reset switch 23 is opened to render the SCR 20 non-conductive. As a result, there is no longer any current flowing to the SCR 20, but a current flows to the resistor 28 parallel-connected to the SCR 20. Since a small current is only required to maintain the member 16b attracted to the core 19, such small current may be provided by the current flowing through the resistor 28.

Thus, the motor 10 continues to rotate and, when the insulating plate 13 comes out of contact with the reset switch 23, this reset switch is again closed. However, when the SCR 20 is triggered, the capacitor 21 discharges through the SCR 20 and the residual charge is also discharged through the resistor 22 and therefore, even after the reset switch 23 is again closed, the capacitor 21 will have no charge for triggering the SCR 20 and thus the SCR 20 will remain non-conductive.

To terminate the photography, the switches 3 and 4 are returned to their shown positions, whereupon the holding current is cut off to permit the restraining lever 16 to be returned to its original position by the spring 18, and the phase switch 9 permits the motor 10 to further rotate until it is stopped at the position where the projection 15 is engaged with the restraining pawl 16a.

Next, one-frame photography will be explained.

The switch 5 is opened to operate the switches 3 and 4 associated therewith. The switch 3 is changed over from the contact 3a to the contact 3b and the holding switch 4 is closed. The starting operation is the same as what has already been described. When the rotation of the motor brings the insulating plate 13 into contact with the switch 23 to open this switch, the SCR 20 is rendered non-conductive to open the switch 8, thus cutting off the current flow to the coil 6. As a result, the restraining lever 16 is returned to its initial position to open the motor switch 8, but the phase switch 9 permits the motor to further rotate until it is stopped at the position where the projection 15 is engaged with the restraining pawl 16a, whereby one-frame photography is completed.

Figure 6:
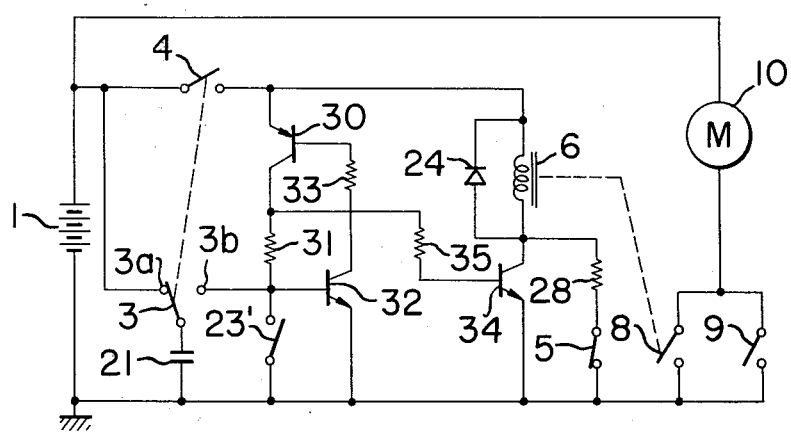
FIG. 6 is a circuit diagram showing a fifth embodiment of the present invention.

FIG. 6 shows a fifth embodiment which employs transistors in lieu of the SCR employed in the above-described fourth embodiment. This embodiment will be described with respect only to its differences from the fourth embodiment.

Transistor 30 has its emitter connected to the positive terminal of the power source 1 through the holding switch 4, its collector connected to the junction between the base of transistor 32 and the contact 3b through resistor 31, and its base connected to the collector of the transistor 32 through resistor 33.

The emitter of the transistor 32 is connected to the negative terminal of the power source 1.

Reset switch 23' is parallel-connected between the base and emitter of the transistor 32. Alternatively, the reset switch 23' may be parallel-connected between the base and emitter of the transistor 30. This reset switch 23' replaces the reset switch 23 in the fourth embodiment, and is designed such that it is opened before the start of photography and closed in response to rotation of the motor 10 a predetermined time after the start of photography but at least before completion of one-frame photography.

Transistor 34 has its base connected to the collector of the transistor 30 through resistor 35, its collector connected to the holding switch 4 through the coil 6, and its emitter connected to the negative terminal of the power source 1. A serial connection of resistor 28 and switch 5 identical with that in the fourth embodiment is connected between the collector and emitter of the transistor 34.

Operation of the above-described construction will now be described.

The switch 4 is closed and simultaneously therewith, the switch 3 is changed over from the contact 3a to the contact 3b. Since the reset switch 23' is open, the terminal voltage of the starting capacitor 21 is applied to the base-emitter of the transistor 32 to render this transistor conductive. This conduction of the transistor 32 also renders the transistors 30 and 34 conductive at a time. In other words, when the switch 3 is connected to the contact 3b, the transistors 32, 30 and 34 conduct at a time and the collector-emitter resistance of the transistor 34 during its conduction is so much smaller than the resistance of the resistor 28 that a heavy current flows to the coil 6. Thus, the motor 10 is rotated as described above, thereby starting the photography.

Also, the collector current of the transistor 30 flows to the base of the transistor 32 and therefore, once these two transistors conduct, they remain in conductive state independently of the capacitor 21, unless the switch 23' is closed.

Thereafter, from the start of photography till before one-frame photography is completed, the switch 23' is closed in response to rotation of the motor to render the transistor 32 and accordingly the transistors 30 and 34 non-conductive. Even if the switch 23' is opened later again, the transistor 32 will never conduct, because the capacitor 21 has completely discharged during the closing of the switch 23'.

Therefore, if the switch 5 is opened now, namely, if one-frame photography is taking place, the transistor 34 will be in non-conductive state to entirely cut off the current flow to the coil 6, so that the switch 8 will be opened while the phase switch 9 will permit the motor 10 to rotate until it is stopped at the position where the projection 15 is engaged with the restraining pawl 16a. Conversely, if the switch 5 is closed, namely, if continuous photography is taking place, a current will flow to the coil 6 through resistor 28 and switch 5 irrespective of the transistor 34 having become non-conductive, so that the restraining lever 16 remains attracted to the core 19 to permit the continuous photography to progress until the switches 3 and 4 are changed over to their positions shown.

It will thus be seen that the reset switch 23' in the fifth embodiment is functionally similar to the reset switch 23 in the fourth embodiment but enjoys increased durability because it is disposed between the base and emitter of the transistor 32 so that no heavy current flows to itself.

Description will further be made of a sixth embodiment of the present invention in which an electromagnetic trigger device is intermittently operated to effect one-frame timer photography.

Figure 7:
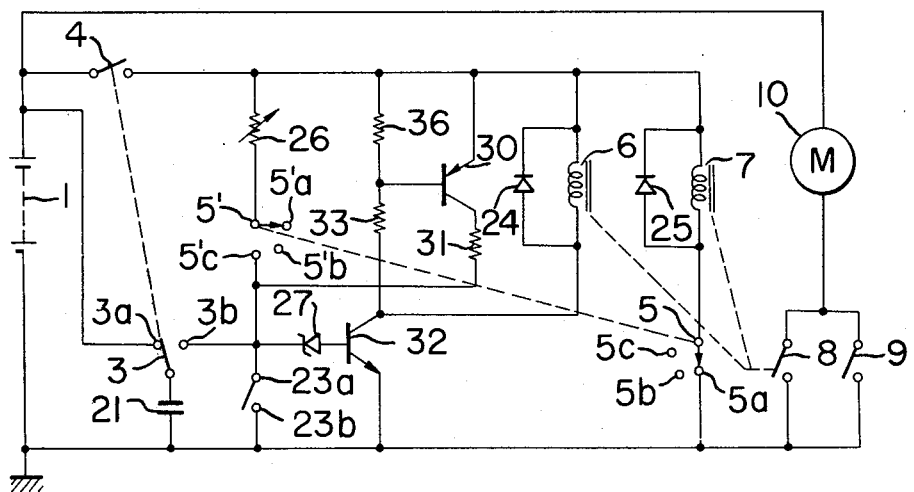
FIG. 7 is a circuit diagram showing a sixth embodiment of the present invention.

In FIG. 7 which shows the sixth embodiment, reference numerals 1 and 2 designate a power source and a starting capacitor, respectively. A trigger switch 3 has change-over contacts 3a and 3b and is operatively associated with holding switch 4. The trigger switch 3 and the holding switch 4 are also operatively associated with unshown camera's release button. When the release button is in underpressed or inoperative position, the trigger switch 3 is closed at the contact 3a while the holding switch 4 is in open position. Depression of the release button will close the holding switch 4 and change over the trigger switch 3 to the contact 3b to thereby provide a photographing condition which will hereinafter be described. A mode change-over switch 5' has change-over contacts 5'a, 5'b and 5'c and may be changed over between these contacts to select any desired mode of photography. A variable resistor 26 is an integrating resistor for providing a time constant during timer operation. Contacts 23a and 23b constitute a reset switch which is opened in the inoperative position of the release button. Zener diode 27 is connected to the base of transistor 32 and selected such that the sum of the Zener voltage and the threshold voltage across the base-emitter which can render the transistor 32 conductive is lower than the minimum available voltage of the power source 1. The collector of the transistor 32 is connected to the base of the transistor 30 through resistor 33 and the collector of the transistor 30 is connected to the base of the transistor 32 through the Zener diode 27 to form a positive feedback circuit, whereby there is constituted a bistable switching circuit. Starting coil 6 is connected to the collector of the transistor 32 and controllable by said switching circuit. Holding coil 7 is serially connected to the mode change-over switch 5. The starting coil 6 has its resistance selected to such a small value that when a current flows thereto it can produce a magnetic force sufficient to attract the member 16b. On the other hand, the holding coil 7 has its resistance selected to a great value, because this coil is intended only to produce a magnetic force so that the member 16b attracted by the starting coil 6 may be held so. The mode change-over switch 5 has change-over contacts 5a, 5b and 5c and is operatively associated with the mode change-over switch 5' to select various modes of photography which will hereinafter be described. There is further seen a DC motor 10, a motor switch 8 adapted to be closed by energization of the coils 6 and 7, and a phase switch 9.

Diodes parallel-connected to the respective coils 6 and 7 serve to absorb the counter voltages produced by these coils so as to prevent such counter voltages from affecting other elements.

FIG. 8 is a perspective view showing an embodiment of the mechanism to which the circuit of FIG. 7 is applied. The construction shown in FIG. 8 is similar to that shown in FIG. 2, with the exception that the reset switch 23a, 23b replaces the reset switch 23.

The construction of the reset switch 23a, 23b will be described with reference to FIG. 8 and FIG. 9 which shows the reset switch of FIG. 8 as viewed in the direction of the shaft 14.

A cam 23b, which is a conductor, is mounted on the conductive shaft 14 which is at ground potential, and a conductive member 23a of resiliency is secured to the shaft in opposed relationship with the cam 23b. The solid line in FIG. 9 shows the position in which the projection 15 is restrained against movement by the restraining pawl 16a and the switch 23a, 23b is open. The broken line shows the position in which the projection 15 has been liberated with the gear 12 rotated through about 90° and with the cam 23b and conductive member 23a being in contact to close the reset switch.

The electromagnetic trigger device of the above-described construction will now be described in operation.

Description will first be made of the operation occurring when the mode change-over switches 5' and 5 select the contacts 5'a and 5a with the switch 5' opened and the switch 5 closed, namely, when the mode of continuous photography is selected. When unshown release button is depressed, the holding switch 4 associated therewith is closed to change over the trigger switch 3 to the contact 3b from the contact 3a connected to the power source. Thereupon, the charge stored in the starting capacitor 21 up to the level of the source voltage flows as the base current of the transistor 32 through the Zener diode 27 since the Zener voltage of the Zener diode 27 is selected as described above. As a result, the transistors 32 and 30 forming the positive feedback switching circuit are both rendered conductive and maintained so after the capacitor has discharged its charge. When the transistor 32 conducts, a current flows to the starting coil 6 and the core 19 is excited by the coils 6 and 7 to produce a sufficient attraction to attract the member 16b of the restraining lever 16. Thus, the restraining lever 16 is rotated clockwise to liberate the projection 15 and the motor switch 8 is closed to rotate the motor 10. Rotation of the motor causes rotation of the reduction gear 12 and the reset switch 23a, 23b is closed within one-quarter rotation of the gear 12 from its rest position. The closing of the reset switch 23a, 23b renders the transistor 32 non-conductive and also permits all the charge in the starting capacitor to be discharged. When the transistor 32 is rendered non-conductive, the transistor 30 is also rendered non-conductive and such state is maintained even if the reset switch 23a, 23b is opened by the action of the positive feedback. Thus, there will be no current flowing to the starting coil 6 within one-quarter rotation of the gear 12, but the holding coil 7 is sufficiently excited to maintain the member 16b attracted to the core 19 so that the member 16 remains in the attracted position to permit the motor 10 to continue its rotation and effect continuous photography as long as the holding switch 4 is closed.

Next, in order to discontinue the photography, the release button is released and thereby the trigger switch 3 is changed over to the contact 3a while the holding switch 4 is opened to cut off the current flow to the coil 7, so that the core 19 is deenergized to permit the restraining lever 16 to be rotated counter-clockwise into contact with the corresponding side of the gear 12 by the force of the spring 18. This counter-clockwise rotation of the restraining lever 16 opens the motor switch 8, but as long as the phase switch 9 is closed, the motor 10 continues to rotate and, when the insulating member 13 has come into contact with the switch 9, this switch 9 is opened to deenergize the motor 10. Simultaneously therewith, the projection 15 is engaged by the restraining pawl 16a of the restraining lever 16 to stop the reduction gear 12 on the spot. The motor 10 is stopped always at the position where the projection 15 is engaged with the restraining pawl 16a and therefore, by connecting the shutter mechanism to the interlocking shaft 14 so that the shutter is closed when said position is established, it will be ensured to the cine-camera that the motor be stopped with the shutter closed even if the trigger switch 3 and holding switch 4 are returned to their shown positions at any time during photography.

One-frame photography will now be described.

The mode change-over switches 5' and 5 are changed over to the contacts 5'b and 5b, respectively, so that the switch 5 is opened with the switch 5' remaining opened. Thus, the mode of one-frame photography is selected.

As described previously, when the release button is depressed, the holding switch 4 is closed and the trigger switch 3 is changed over to the contact 3b, but the change-over switch 5 has selected the non-connected contact 5b so that no current flows to the holding coil 7, which thus performs no holding operation. By the starting capacitor 21 charged with the source voltage, the switching circuit provided by the transistors 30 and 32 is rendered conductive in the same manner as previously described, so that the starting coil 6 is supplied with a current to excite the core 19, which thus attracts the member 16b. As already mentioned, the member 16b is attracted to the core 19, the projection 15 is liberated from restraint and the motor switch 8 is closed to rotate the motor 10 and accordingly the reduction gear 12. Within one-quarter rotation of the reduction gear 12 from its rest position, the reset switch 23a, 23b is closed to render the switching circuit non-conductive and permit the starting capacitor 21 to discharge. The current flow to the starting coil 6 is cut off and the restraining lever 16 is returned to its initial position by the spring 18 within one full rotation of the reduction gear 12. The return of the restraining lever 16 opens the motor switch 8, but as already described, the phase switch 9 permits the motor 10 to rotate until it is stopped at the position where the projection 15 is engaged with the restraining pawl 16a. Such condition will continue unless the release button is temporarily released and again depressed. Thus, one-frame photography is accomplished.

Description will now be made of one-frame timer photography.

The mode change-over switches 5' and 5 are changed over to the contacts 5'c and 5c, respectively, so that the switch 5' is closed while the switch 5 is opened. Thus, the mode of one-frame timer photography is selected.

When the release button is depressed, the holding switch 4 is closed and the trigger switch 3 is changed over to the contact 3b, but since the change-over switch 5 has selected the non-connected contact 5c, no current flows to the holding coil 7, which thus performs no holding operation. By the starting capacitor 21, the switching circuit provided by the tansistors 30 and 32 is rendered conductive in the same manner as previously described, so that the starting coil 6 is supplied with a current to liberate the projection 15 from restraint and close the motor switch 8, thus rotating the motor 10 and accordingly the reduction gear 12. Within one-quarter rotation of the reduction gear 12 from its rest position, the reset switch 23a, 23b is closed to render the switching circuit non-conductive and permit the starting capacitor 21 to discharge. The current flow to the starting coil 6 is cut off and the restraining lever 16 is returned to its initial position by the spring 18 within one full rotation of the reduction gear 12, with the reduction gear 12 being stopped at the position where the projection 15 is engaged with the restraining pawl 16a. Thus, one-frame photography is accomplished. However, since the change-over switch 5' has selected the contact 5'c, the resistor 26 is serially connected with the starting capacitor 21 to thereby form an integrating circuit and therefore, after the reset switch 23a, 23b is re-opened, the capacitor 21 is charged by the power source 1 through the resistor 26. After charged, the potential of the capacitor 21 rises with time. Therefore, by selecting the resistance value of the resistor 26 and the electrostatic capacity of the capacitor 21 so that the potential of the capacitor 21 reaches a sufficient level to render the transistor 32 conductive a predetermined time after the above-described one-frame photography has been completed, i.e. after the gear 12 has made one full rotation, the transistors 30 and 32 may automatically conduct again to rotate the motor 10 and accomplish a second one-frame photography the predetermined time after completion of the previous one-frame photography. Thus, one-frame timer photography occurs at a predetermined time interval determined by the time constant of the capacitor 21 and resistor 26 as long as the release button is depressed with the trigger switch 3 closed at the contact 3b and with the holding switch 4 closed. If the release button is provided with a mechanism for locking it in depressed condition, there will be no need to manually hold the release button in depressed condition throughout the timer photography.

Figure 10:
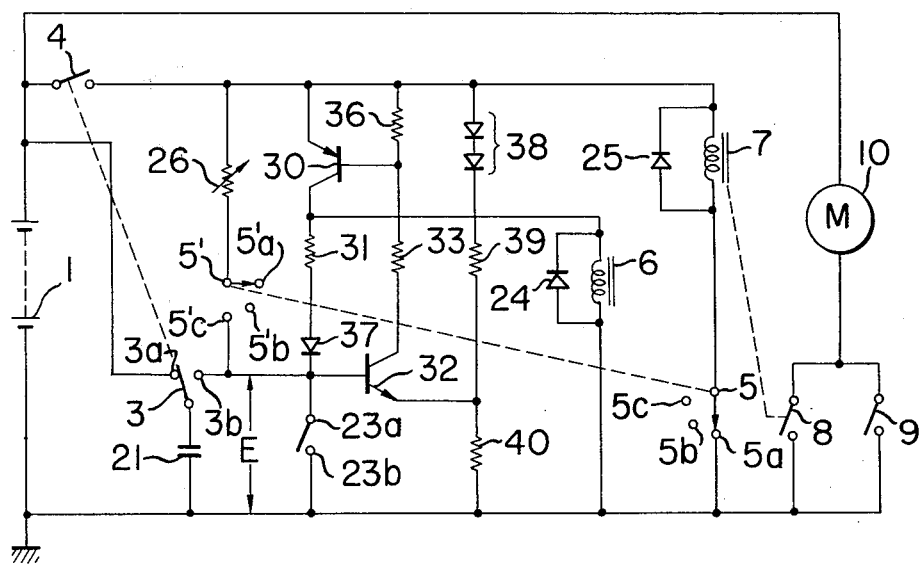
FIG. 10 is a circuit diagram showing a seventh embodiment of the present invention.

FIG. 10 shows a seventh embodiment of the present invention. In the sixth embodiment, the time interval during the timer photography increases with reduction in the source voltage. This is because, in the sixth embodiment, the detection of the potential across the capacitor 21 is determined by the Zener voltage of the Zener diode 27 and the threshold voltage between the base and emitter of the transistor 32, independently of the source voltage. The seventh embodiment compensates for the variation in the time interval resulting from the variation in the source voltage.

In FIG. 10, the members functionally similar to those in FIGS. 7 and 8 are designated by similar reference characters. Therefore, description need not be made of what has already been described in connection with FIGS. 7 and 8.

Resistors 40 and 39 are serially connected together, one end of the resistor 40 is connected to the negative terminal of the power source 1, the junction between the resistors 40 and 39 is connected to the emitter of the transistor 32, one end of the resistor 39 is connected to a diode 38 for compensating for voltage reduction and temperature, and one end of the diode 38 is connected to the positive terminal of the power source 1 through switch 4. The collector of the transistor 32 is connected to the base of the transistor 30 through resistor 33 and the collector of the transistor 30 is connected to the base of the transistor 32 through resistor 31 and backflow blocking diode 37, thus constituting a positive feedback switching circuit. The starting coil 6 is connected to the collector of the transistor 30 and controllable by ON-OFF of the transistor 30.

When the mode of continuous photography has been selected, namely, when the switches 5' and 5 have selected the contacts 5'a and 5a, respectively, with the switch 5' being opened and the switch 5 being closed, if the release button is depressed, then the switching circuit is triggered into conductive state by the capacitor 21 charged with the source voltage, so that a current flows to the starting coil to rotate the motor 10, which in turn closes the reset switch 23a, 23b to render the switching circuit non-conductive and causes the capacitor 21 to discharge, and thus there is no current flowing to the starting coil 6, whereas the member 16b of the restraining lever 16 is held attracted to the core 19 by the holding coil 7, thereby permitting continuous photography to progress until the release button is returned. When the release button has been returned, the holding switch 4 is opened to deenergize the holding coil, so that the restraining lever 16 is returned and stopped at the position where the projection 15 is engaged with the restraining pawl 16a.

When the mode of one-frame photography has been selected, namely, when the switches 5' and 5 have selected the contacts 5'b and 5b, respectively, with both switches 5' and 5 being opened, no current will flow to the holding switch 7 even if the release button is depressed to close the switch 4, and one-frame photography will thus be effected by the trigger capacitor 21 and reset switch 23a, 23b in the same manner as described previously.

When the mode of one-frame timer photography has been selected, namely, when the switches 5' and 5 have selected the contacts 5'c and 5c, respectively, with the switch 5' closed and the switch 5 remaining open, no current will flow to the holding coil 7 even if the release button is depressed to close the switch 4, and the switching circuit will be rendered conductive by the trigger capacitor 21 and then closing of the reset switch 23a, 23b triggers the switching circuit into non-conductive state and causes the capacitor 21 to discharge so as to permit one-frame photography, whereafter the capacitor 21 will be charged through the resistor 26 in the same manner as described with respect to FIG. 7. The backflow blocking diode 37 will prevent the charging current from being bypassed through the resistor 31 and coil 6, and the emitter of the transistor 32 will neither bypass the charging current of the capacitor because this emitter is biassed by a voltage divided by resistors 39 and 40.

When the potential across the capacitor 21 rises to a sufficient level to render the transistor 32 conductive a predetermined time after completion of the one-frame photography, the switching circuit provided by the transistors 32 and 30 is triggered into conductive state and the motor 10 is rotated, but the reset switch 23a, 23b triggers the switching circuit back into non-conductive state and causes the capacitor 21 to discharge, whereby one-frame photography is again accomplished automatically.

Thereafter, as long as the release button remains depressed, the above-described operation is repeated to effect one-frame photography at a predetermined time interval.

Here, the integrating time will be considered. Let $E_B$ be the voltage of the power source 1, C be the capacity of the capacitor 21, R be the resistance value of the resistor 26, R39 and R40 be the values of the voltage dividing resistors 39 and 40, $V_D$ be the forward voltage of the diode, and $V_{BE}$ be the base-emitter voltage for which the transistor 32 conducts. Also, let $E_O$ be the minimum voltage for which the switching circuit is triggered i.e., the base voltage for which the transistor 32 conducts. Then, $$E_O = \frac{(E_B - V_D)R_{40}}{R_{39} + R_{40}} + V_{BE}$$

On the other hand, the time $t$ required for the potential across the capacitor 21 to reach $E_O$ from zero is expressed:

$$t = CR \log e \frac{E_B}{E_B - E_O}$$

Hence, $$t = CR \log e \frac{E_B}{E_B - \frac{(E_B - V_D)R_{40}}{R_{39} + R_{40}} - V_{BE}}$$

where $$\frac{V_D R_{40}}{R_{39} + R_{40}} - V_{BE} = 0.$$

Thus, the term $E_B$ is eliminated, as a result of which $t$ is expressed:

$$t = CR \log e \frac{1}{1 - \frac{R_{40}}{R_{39} + R_{40}}}$$

In other words, by selecting the forward voltage $V_D$ of the diode 38 and the resistance values $R_{39}$ and $R_{40}$ of the resistors 39 and 40 so as to satisfy the relation that $$\frac{R_{40}}{R_{39} + R_{40}} = \frac{V_{BE}}{V_D},$$

a predetermined time interval may always be provided without being affected by the variation in the source voltage. Temperature compensation is also effected at the same time, but this is similar to the voltage compensation and need not be described in particular.

In the sixth embodiment of FIG. 7, the capacitor 21 is charged through the resistor 26 during one-frame timer photography. Therefore, the time required for the terminal voltage of the capacitor 21 to attain a predetermined value is dependent on the source voltage. Thus, by causing the capacitor 21 to be charged through a constant current circuit instead of the resistor 26, the time required for the terminal voltage of the capacitor 21 to attain a predetermined value may be independent of the source voltage and accordingly, the time interval during the one-frame timer phhotography may be unaffected by the variation in the source voltage.

FIG. 11 shows an eighth embodiment in which one-frame timer photography is effected by causing the capacitor 21 to be charged through a constant current circuit.

In FIG. 11, through Zener diode 41 and resistor 42, the base of transistor 44 is supplied with a constant potential determined by the Zener voltage of Zener diode 41, so that the base-emitter voltage of the transistor 44 remains constant without being affected by any variation in the source voltage. COnsequently, during one-frame timer photography, the capacitor 21 is charged with a constant current through the transistor 44 and thus, the timer interval during one-frame photography is constant without being affected by any variation in the source voltage.

Operations for continuous photography and one-frame photography need not be described because these are similar to what has been described with respect to the sixth embodiment of FIG. 7.

FIG. 12 shows the circuit according to a ninth embodiment.

In this embodiment, an SCR replaces the switching circuit of FIG. 7 provided by transistors 32 and 30 and the holding coil 7 is eliminated by the coil 6 serves as the starting coil and also as the holding coil. The construction of the reset switch differs from that shown in FIGS. 8 and 9, and is constituted by a change-over switch 23, 23a, 23b, 23c in the manner as shown in FIG. 13. In FIG. 13, reference numeral 14 designates a main interlocking shaft as in FIG. 9. A cam 23c of insulating material is mounted on the main interlocking shaft 14. A spring change-over member 23 is secured to the shaft in opposed relationship with the cam 23c, and this change-over member 23 engages the contact 23a when the cam 23c is not in contact with the change-over member 23. When the cam 23c is rotated counterclockwise as indicated by arrow and into contact with the change-over member 23, the latter is changed over to the contact 23c.

The solid line in FIG. 13 shows a position in which the projection 15 of FIG. 8 is restrained against movement by the restraining pawl 16a. The phantom line shows a position in which the projection 15 has been liberated from restraint and the gear 12 has been rotated through 90°, whereas the cam 23b has caused the change-over member 23 to engage the contact 23c.

When the mode of continuous photography has been selected, namely, when the switches 5' and 5 have selected the contacts 5'a and 5a, respectively, if the release button is depressed, then the holding switch 4 is closed while the voltage stored in the starting capacitor 21 charged with the source voltage is applied through the Zener diode 27 to the gate electrode of the SCR 20, which is thus triggered into conductive state to permit a great current flow to the coil 6, which thus actuates the restraining lever 16 to rotate the motor 10. Rotation of the motor 10 causes the cam 23b to change over the reset switch 23 to the contact 23b, as shown in FIG. 13, so that the SCR 20 is rendered non-conductive and the capacitor 21 discharges. Although the SCR 20 has been rendered non-conductive, a sufficient current to hold the member 16b attracted to the core 19 flows to the coil 6 to hold the member 16b in attracted position so that continuous photography can continue until the release button is returned. As soon as the release button is returned, the holding switch 4 is opened to deenergize the core 19, thus returning the restraining lever until stopped at the position where the projection 15 is engaged with the restraining pawl.

When the mode of one-frame photography has been selected, namely, when the switches 5' and 5 have selected the contact 5'b and 5b, respectively, the release button is depressed and the switch 4 is closed while the SCR 20 is triggered into conductive state by the capacitor 21 to permit a current flow to the coil 6, which thus actuates the restraining lever 16 to rotate the motor 10. With the rotation of the motor 10, the gear 12 is rotated to cause the cam 23c to change over the reset switch 23 within one-quarter rotation of the cam, so that the SCR is rendered non-conductive and the capacitor 21 discharges, but since the bypass provided by the resistor 28 is cut off, no holding current flows to the coil 6 and thus, the restraining lever is returned to permit one-frame photography to occur.

When the mode of one-frame timer photography has been selected, namely, when the switches 5' and 5 have selected the contacts 5'c and 5c, respectively, no holding current flows through the bypass provided by the resistor 28, as described above, and when one-frame photography has been done, the capacitor 21 discharges and the SCR is rendered non-conductive, but the capacitor 21 is again charged through the resistor 26 and the potential of the capacitor 21 rises with time so as to exceed the sum of the Zener voltage of the Zener diode 27 and the gate voltage capable of triggering the SCR 20 into conductive state, whereupon the SCR 20 is triggered into conductive state to again permit one-frame photography to be effected. Thus, as long as the release button is depressed, the above-described operation is repeated to effect one-frame photography at a predetermined time interval.

FIG. 14 shows a tenth embodiment which employs a constant current circuit instead of the resistor 26 used in the ninth embodiment of FIG. 12, whereby preventing the time interval during one-frame timer photography from being varied with the variation in the source voltage.

In FIG. 14, transistor 44, whose base is supplied with a constant current through Zener diode 41 and resistor 42, acts as the constant current source during one-frame timer photography and charge the capacitor 21 with a constant current. Therefore, the time interval during one-frame timer photography is unaffected by any variation in the source voltage.

Operation for continuous photography and one-frame photography are entirely the same as what has been described with respect to the ninth embodiment.

In the sixth to tenth embodiments of the present invention, the reset switch serves to render the SCR or the transistor switching circuit non-conductive and also to effect discharging of the capacitor 21, whereas it will be apparent that discrete switches may be employed to render the switching circuit non-conductive and to effect discharging of the capacitor 21.

In accordance with the present invention, as described above, any desired one-frame photography may be reliably accomplished and one-frame photography at a predetermined time interval may be automatically accomplished, by a vary simple construction, irrespective of any variation in the source voltage or in the number of revolutions of the motor.

In addition, the starting capacitor may be of smaller capacity and accordingly, of smaller size, which in turn leads to the provision of a compact electromagnetic trigger device.

I claim:

1. An electromagnetic trigger device in a camera comprising:
    a rotary motor;
    a mechanism interlocked with said motor for driving a shutter and transporting film, said mechanism being moved between a first position in which the shutter is open and a second position in which the shutter is closed;
    restraining means movable between a restraining position, in which said restraining means restrains said mechanism in said second position, and a non-restraining position;
    a motor switch interlocked with said restraining means to connect said motor to a power source when said restraining means is in said non-restraining position;
    electromagnetic starting means for attracting said restraining means to move it to said non-restraining position when said starting means is energized;
    switching means for connecting said starting means to said power source when said switching means is conductive;
    a starting capacitor;
    a trigger switch for connecting selectively said starting capacitor to said power source before the start of photography and then to said switching means to apply the terminal voltage of said starting capacitor to said switching means to render it conductive;
    reset means responsive to rotation of said motor to render said switching means non-conductive when said motor has made a predetermined number of revolutions within the number of revolutions required for the motor to transport one frame of film;
    a mode selecting switch for selecting one of continuous photography and one-frame photography; and
    electromagnetic holding means connected to said power source to hold said restraining means in said non-restraining position when said mode selecting switch selects said continuous photography.

2. A device according to claim 1, wherein said starting means includes a solenoid connected in series with said switching means and
    said holding means includes said solenoid and a resistor connected in parallel with said switching means.

3. A device according to claim 1, wherein said switching means comprises a switching transistor connected in series with said starting means.

4. A device according to claim 1, wherein said switching means comprises a bistable circuit.

5. A device according to claim 1 further comprising a phase switch connected in parallel with said motor switch, said phase switch being responsive to rotation of said motor so that it is normally closed and is opened when said mechanism is in the second position.

6. A device according to claim 1 further comprising charging means for charging said starting capacitor when it is connected to said switching means; and switch means for connecting said charging means to said starting capacitor to charge said starting capacitor for repetitive one-frame photography.

7. A device according to claim 6 further comprising discharging means for permitting discharge of said starting capacitor for a predetermined time interval after said reset means renders said switching means non-conductive.

8. A device according to claim 6, wherein said charging means comprises a resistor through which said starting capacitor is charged during said repetitive one-frame photography.

9. A device according to claim 6, wherein said charging means comprises a constant current circuit.

* * * * *